United States Patent [19]
Pajon

[11] Patent Number: 5,669,661
[45] Date of Patent: Sep. 23, 1997

[54] IMPROVEMENTS TO VEHICLE SEAT BACKS

[75] Inventor: Marc Pajon, Etampes, France

[73] Assignee: Bertrand Faure Equipements SA, France

[21] Appl. No.: 573,894

[22] Filed: Dec. 18, 1995

[30] Foreign Application Priority Data

Dec. 19, 1994 [FR] France ................... 94 15246

[51] Int. Cl.$^6$ ................................ B60N 2/42
[52] U.S. Cl. ................ 297/216.13; 297/216.14; 296/68.1
[58] Field of Search ............ 297/216.1, 216.13, 297/216.14; 296/68.1; 280/749, 751

[56] References Cited

U.S. PATENT DOCUMENTS

| | | |
|---|---|---|
| 3,797,858 | 3/1974 | Yamada . |
| 4,027,906 | 6/1977 | Matsuoka et al. ............ 280/751 |
| 5,054,845 | 10/1991 | Vogel ................ 297/216.14 X |
| 5,186,494 | 2/1993 | Shimose . |
| 5,295,729 | 3/1994 | Viano ................... 297/216.14 |
| 5,328,226 | 7/1994 | Thomas ................... 296/68.1 |

FOREIGN PATENT DOCUMENTS

| | | |
|---|---|---|
| 2 100 676 | 9/1972 | Germany . |
| 22 65 216 | 12/1976 | Germany . |
| 27 47 398 | 5/1978 | Germany . |
| 2750823 | 5/1979 | Germany ............... 280/749 |
| 42 30 670 | 3/1994 | Germany . |
| 1 391 644 | 4/1975 | United Kingdom . |

*Primary Examiner*—Peter R. Brown
*Attorney, Agent, or Firm*—Larson and Taylor

[57] ABSTRACT

The vehicle seat back includes two deformable elements both extending across the back (2) between two lateral uprights (3) defining the sides of the back, the elements comprising a first element (7) suitable for dissipating energy by deforming plastically in progressive manner, and a second element (8) suitable for stopping deformation of the first, the second element being disposed in such a manner that when a strong longitudinal thrust is applied to its middle portion, it begins by lengthening while offering practically no resistance until it reaches a given length, after which it becomes inextensible.

9 Claims, 2 Drawing Sheets

IMPROVEMENTS TO VEHICLE SEAT BACKS

The invention relates to vehicle seat backs.

It sets out to improve the safety of the occupants of seats including such backs in the event of vehicles fitted with such seats being subjected to shocks.

The drawbacks of present-day seats in this respect are as follows.

In the event of a shock being applied to the back of the vehicle, the occupant of the seat is suddenly urged backwards.

If the back of the seat then includes at least one rigid transverse bar or the like, the occupant is thrown against the bar, which can give rise to serious body lesions.

However, if the back does not include a rigid transverse bracing structure, then the backwards motion of the occupant is not limited enough, so the occupant can pass through the seat back and will finally come to rest only against obstacles that are unsuitable and that therefore generate injuries.

In the event of a shock being applied to the front of the vehicle, non-secured masses present in the vehicle, and in particular baggage placed in the boot or trunk thereof behind the back seat, are thrown forwards and on striking the seat backs in their way, they can likewise injure the occupants of the seats.

Above all, an object of the invention is to remedy these drawbacks.

To this end, a vehicle seat back of the invention is essentially characterized in that it includes two deformable elements both extending across the back between two lateral uprights that define the sides of the back, said elements comprising a first element suitable for dissipating energy by deforming plastically in progressive manner, and a second element suitable for stopping the deformation of the first, said second element being disposed in such a manner that when large longitudinal thrust is applied to its middle portion, it begins by lengthening while offering practically no resistance until it reaches a given length, after which it becomes inextensible.

In advantageous embodiments, use is also made of one or more of the following dispositions:

- the first element is a plate, in particular a sheet metal plate;
- the plate includes at least one rib;
- the second element is an inextensible strap normally including at least one portion that is folded over in a flat Z-shape and stitched together;
- the second element is a harness comprising a plurality of lengths of strap forming at least one stellated mesh;
- the second element is a net having multiple meshes;
- the back belongs to a front seat of a vehicle and the two elements are juxtaposed horizontally one against the other, the first element being disposed nearer the front of the seat;
- the back belongs to a vehicle back seat and its two elements are horizontally juxtaposed one against the other, the first element being disposed towards the back of the vehicle; and
- the back comprises a first element of the above-defined type disposed horizontally and sandwiched between two second elements of the above-defined type.

In addition to these main dispositions, the invention includes certain other dispositions that are preferably used simultaneously therewith and that are explained more fully below.

Preferred embodiments of the invention are described below with reference to the accompanying drawing in a manner that is naturally non-limiting.

FIG. 1 of the drawing is a diagrammatic horizontal section through a vehicle front seat fitted with a back of the invention, the seat being shown with its back in its normal, non-deformed state.

Figure 1:
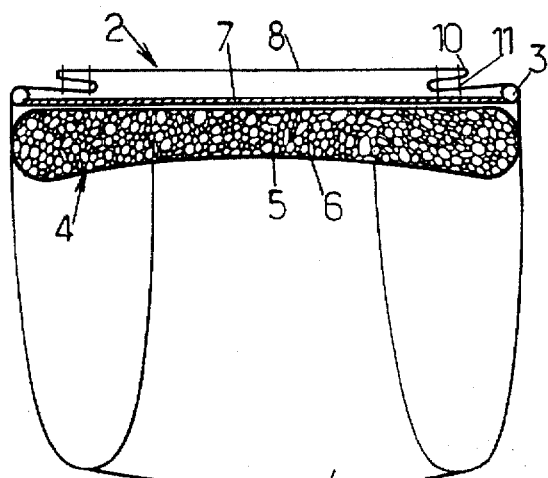

The vehicle front seat shown in FIG. 1 comprises, in conventional manner, a seat proper 1, and a back 2 that comprises firstly side uprights 3, in this case constituted by metal tubes, and secondly a back cushion 4 e.g. constituted by a foam body 5 inside a cover 6.

The back 2 further includes, both a plate 7 and an element that operates in traction only, e.g. a strap 8 disposed behind the plate 7, both these items extending transversely and horizontally between the two uprights 3.

The nature and the thickness of the plate 7 are selected so that the plate lends itself easily to cold plastic deformation when its middle zone is urged backwards in the direction of arrow F (FIG. 2) by pressure from the body of the occupant 12 of the seat, in the event of a shock being applied to the back of the vehicle fitted with the seat.

Naturally, the plate 7 may be used so that it itself constitutes at least a portion of the supporting framework for the cushion 4, and in particular it may be used to limit the lateral flexibility of the back 2.

By way of example, the plate 7 may be constituted by steel that is 0.5 mm to 3 mm thick, or by aluminum that is 1 mm to 5 mm thick, or else by plastics material, and its height may be a few centimeters.

The plate 7 may advantageously include ribs that impart a certain amount of stiffness to the plate and/or that serve to absorb energy by plastic deformation: the dimensions of the ribs are chosen so that they are automatically flattened or even totally eliminated when the plate is deformed.

The strap 8 has two zones 10 that are folded over in a flattened Z-shape, with this locally folded-over state of the strap being made permanent by stitching 11.

The stitching 11 is designed to secure the folds 10 only under normal circumstances, i.e. so long as no shock has been applied to the back of the vehicle.

Otherwise, the stitching 11 must break and be torn out as soon as the magnitude of such a shock exceeds a predetermined level: the strap 8 is then free to extend to its maximum deployed length, which it cannot exceed because it is inextensible.

As a result of the above explanation, in the event of a sufficiently large shock being applied to the back of the vehicle, the occupant 12 of the seat in question tends to be thrown backwards in the direction of arrow F against the back 2, and this gives rise:

firstly to progressive plastic deformation of the plate 7, which deformation gives rise to a high degree of energy dissipation; and secondly to the strap 8 being deployed due to its stitching 11 tearing and the resulting "slack" then being taken up.

By way of indication, the total length of the "slack" may lie in the range 2 cm to 10 cm.

The total length of the strap 8 is designed so that when it is fully deployed it is pressed closely against the sheet 7 in its state of predetermined maximum deformation.

In other words, the characteristics of the two elements 7 and 8 are determined mutually, with the strap 8 serving specifically to limit the deformation of the plate 7 as soon as said deformation has reached its desired maximum value.

This provides the occupant 12 of the seat with good protection against shocks applied to the back of the vehicle by virtue of the special structure of the seat back.

Figure 2:
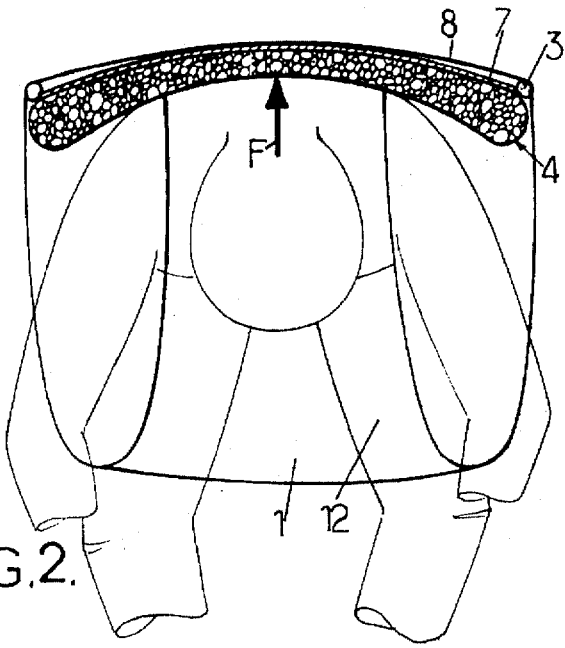
FIG. 2 is a similar view showing the seat with its back as deformed following the application of a shock to the back of the vehicle.

The back of FIGS. 1 and 2 also provides protection against the effects of shocks applied to the front of the vehicle which can throw baggage forwards, which baggage then strikes the back from behind.

Under such circumstances, the positions of the two elements 7 and 8 relative to the shock direction are reversed: the baggage initially encounters the strap 8 and then the plate 7, however that does not alter the function of each element; the plate 7 whose height may then be several tens of centimeters provides its energy dissipating effect as in the case of a shock being applied to the back of the vehicle, and the strap 8 is preferably located at a height where there is a good chance of stopping the forwards movement of objects or people thrown against the back of the seat back.

In a variant, the strap 8 may be replaced by a harness 15 or a net (see below) in which case the probability of it stopping an object or a person thrown forwards against the back of the seat back is even higher.

Figure 3:
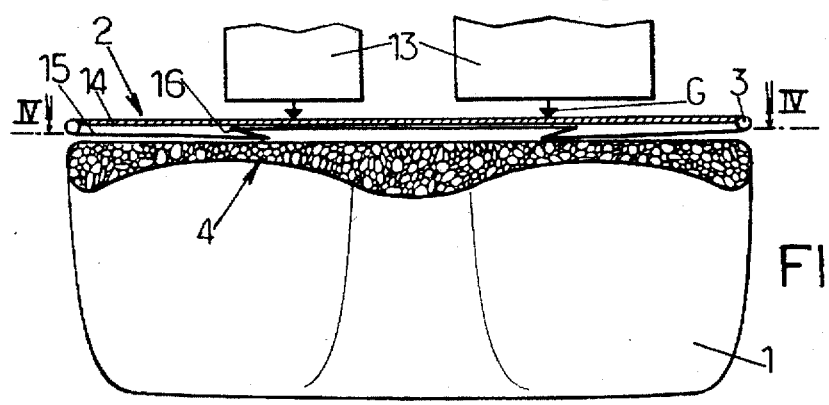
FIG. 3 is another horizontal section showing a vehicle back seat fitted with a back of the invention, in its normal, non-deformed state.
Figure 4:
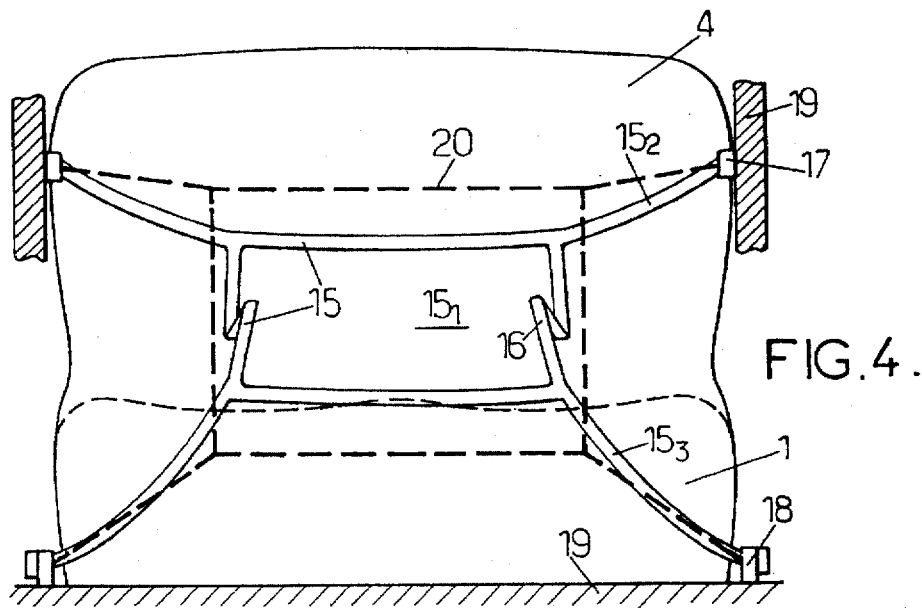
FIG. 4 shows the same back in the plane IV—IV of FIG. 3, i.e. as seen from behind, with certain portions removed.

FIGS. 3 and 4 show a vehicle back seat which, like the above seat, comprises a seat proper 1 and a back 2 itself made up of rigid lateral uprights 3 and a cushion 4.

In FIG. 3, there can also be seen baggage 13 located behind the back 2 and tending, in the event of a shock being applied to the front of the vehicle, to be thrown horizontally forwards against the back along arrows G.

As before, the back 2 also includes two elements 14 and 15 mounted transversely between the uprights 3 and performing the same functions as the above-described elements 7 and 8.

Compared with FIGS. 1 and 2, the horizontal order of the two elements is reversed: the energy-dissipating first element 14 is behind and the second element 15 for limiting the deformation of the first is placed in front of it, against the cushion 4. In this case, the baggage initially encounters the dissipating element, whereas the dissipating element was initially encountered by the back of the passenger in the case shown in FIGS. 1 and 2.

In this embodiment, the element 14 is constituted by a plane plate of height substantially equal to the height of the back, and the element 15 is constituted by a harness having a central mesh $15_1$ extended transversely by two top arms $15_2$ and by two bottom legs $15_3$.

The various lengths making up said harness are advantageously constituted by straps of the same kind as the above strap 7, comparable to the safety belts fitted to vehicle seats, and some of the lengths include folded-over portions 16 which are held in their folded-over state by appropriate stitching, so long as the harness 15 has not been stressed.

The free ends of the lengths $15_2$ and $15_3$ are fixed to anchor points 17 and 18 which are assumed in the drawing to be associated with the body 19 of the vehicle.

In FIGS. 3 and 4, the harness 15 is shown in its rest position by solid lines, while the stretched position of said harness is represented by the dashed line 20.

The assembly operates in a manner entirely analogous to that of the assembly in FIGS. 1 and 2, although it is made the opposite way round: when a sudden shock is applied to the front of a vehicle fitted with the back seat in question, the baggage 13 is instantly thrown horizontally against the back 2 along arrows G, thereby successively giving rise to progressive plastic deformation of the plate 14, thus tearing the stitching in the folded portions 16, and enabling the harness 15 to be deployed.

Once the harness is fully deployed and occupies the position represented by dashed lines 20, it opposes any further deformation of the plate 14: deformation of the plate is thus stopped, as is the forward motion of the baggage 13.

The harness 15 as shown in FIGS. 3 and 4 may be replaced by a harness having a larger number of meshes, or even by an element having multiple meshes like a net.

In all cases, the element in question must cover a sufficiently large portion of the plate 14 to be effective in limiting deformation thereof at a predetermined stage, said element 15 being designed in every case so as to be capable of deploying without opposing much resistance initially, after which it becomes inextensible as soon as it is in its deployed state.

The back shown in FIGS. 3 and 4 also provides protection against the effects of shocks applied to the back of the vehicle, with the harness 15 then stopping the backward motion of the seat occupant after plastic deformation of the plate 14.

When stopping in this way, the harness 15 exerts force on the seat occupant in a manner that is sufficiently distributed to avoid injuring the occupant.

As a result, whichever embodiment is adopted, vehicle seat backs are provided of structure, implementation, and advantages that can be seen sufficiently clearly from the above.

Figure 5:
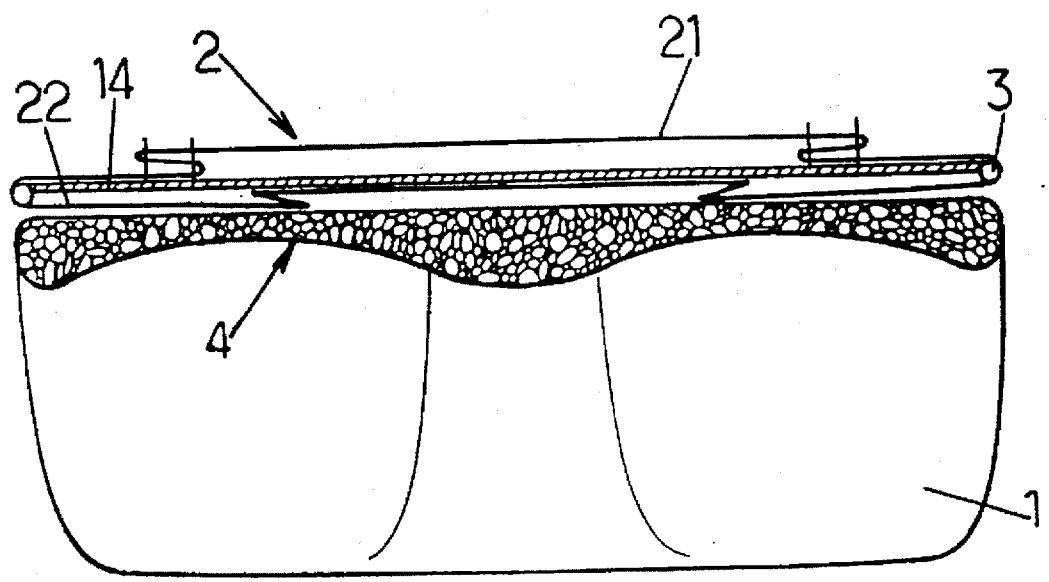
FIG. 5 is a view similar to FIG. 3, showing another embodiment of the invention.

Naturally, and as also results from the above, the invention is not limited specifically to the applications and embodiments that are more particularly described; on the contrary, it extends to any variant, in particular variants in which the energy-dissipating element, constituted in particular by a plate, is placed horizontally, being sandwiched between two deformation-limiting elements 21, 22 (see FIG. 5) of the same kind as the above straps 8 and harness 15, thereby protecting the occupant of the corresponding seat both from shocks applied to the front of the vehicle and from shocks applied to the back of the vehicle, even though both types of protection are already ensured in practice for both possible longitudinal directions of seat back deformation even when only a single deformation-limiting element is provided in the immediate proximity of the energy-dissipating element, as described above.

I claim:

1. A vehicle seat back comprising two deformable elements both extending across the back between two lateral uprights defining the sides of the back, said elements comprising a first element suitable for dissipating energy by deforming plastically in progressive manner, and a second element suitable for stopping deformation of the first element, said second element being disposed in such a manner that when large longitudinal thrust is applied to its middle portion, practically no resistance until said second element begins by lengthening while offering said second element reaches a given length, and thereafter becomes inextensible.

2. A seat back according to claim 1, wherein the first element comprises a plate.

3. A seat back according to claim 2, wherein said plate comprises a sheet metal plate.

4. A seat back according to claim 1, wherein the second element comprises an inextensible strap normally including at least one portion that is folded over in a flat z-shape and stitched together.

5. A seat back according to claim 1, wherein the second element comprises a harness comprising a plurality of lengths of strap forming at least one stellated mesh.

6. A seat back according to claim 1, wherein the second element comprises a net having multiple meshes.

7. A seat back according to claim 1, for fitting to the front seat of a vehicle, wherein the first and second elements are juxtaposed horizontally one against the other, the first element being disposed nearer the front of the seat.

8. A seat back according to claim 1, for fitting to a vehicle back seat, wherein the first and second elements are horizontally juxtaposed one against the other, the first element being disposed towards the back of the vehicle.

9. A seat back according to claim 1, comprising two second elements, the first element being disposed horizontally, sandwiched between the two second elements.

* * * * *

UNITED STATES PATENT AND TRADEMARK OFFICE
CERTIFICATE OF CORRECTION

PATENT NO. : 5,669,661
DATED : September 23, 1997
INVENTOR(S) : PAJON, Marc

It is certified that error appears in the above-indentified patent and that said Letters Patent is hereby corrected as shown below:

Column 4, line 59, after "offering", the following words should appear --practically no resistance until--.

Signed and Sealed this

Thirteenth Day of January, 1998

Attest:

BRUCE LEHMAN

*Attesting Officer*  *Commissioner of Patents and Trademarks*